United States Patent [19]

Lucas

[11] 4,065,536
[45] Dec. 27, 1977

[54] METHOD OF MAKING A PRECISELY PARTITIONED BULBOUS-SHAPE CONTAINER

[75] Inventor: Malcolm Bramel Lucas, Cincinnati, Ohio

[73] Assignee: The Procter & Gamble Company, Cincinnati, Ohio

[21] Appl. No.: 630,105

[22] Filed: Nov. 10, 1975

Related U.S. Application Data

[62] Division of Ser. No. 493,308, July 31, 1974, abandoned.

[51] Int. Cl.² ............................................. B29C 17/07
[52] U.S. Cl. ..................................... 264/98; 264/97; 425/525
[58] Field of Search ..................... 264/89, 90, 92, 94, 264/96–99, 177 R, 296; 425/326 B, 324 B, 387 B, 242 B, DIG. 206, DIG. 209, DIG. 214, 525, 532, 533

[56] References Cited

U.S. PATENT DOCUMENTS

| | | | |
|---|---|---|---|
| 2,918,698 | 12/1959 | Hagen et al. | 425/326 B X |
| 2,951,264 | 9/1960 | Bailey | 264/98 |
| 2,991,500 | 7/1961 | Hagen | 264/96 X |
| 3,189,422 | 6/1965 | Shea et al. | 264/94 X |
| 3,358,062 | 12/1967 | Lemelson | 264/97 X |
| 3,538,543 | 11/1970 | Nataf | 425/DIG. 214 |

FOREIGN PATENT DOCUMENTS

| | | | |
|---|---|---|---|
| 47-38064 | 9/1972 | Japan | 264/94 |

Primary Examiner—Jan H. Silbaugh
Attorney, Agent, or Firm—Thomas J. Slone; John V. Gorman; Richard C. Witte

[57] ABSTRACT

A longitudinally partitioned bulbous-shape, top-opening container of unitary construction is provided which comprises a precisely shaped, sized, and oriented integral bulkhead. Such containers may be made by the method of providing a thermoplastic preform which is longitudinally partitioned by an integral bulkhead of the size, shape, and orientation desired in the finished container, and then blow molding the outer wall of the preform to the bulbous-shape of the finished container while constraining or confining the bulkhead from changing size, shape, or orientation.

1 Claim, 18 Drawing Figures

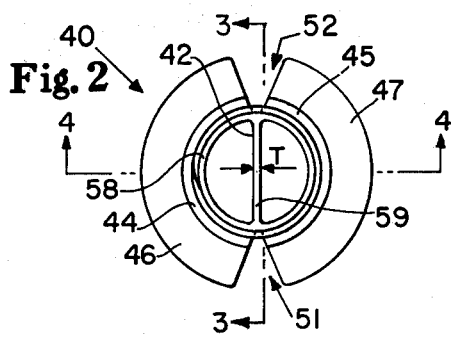
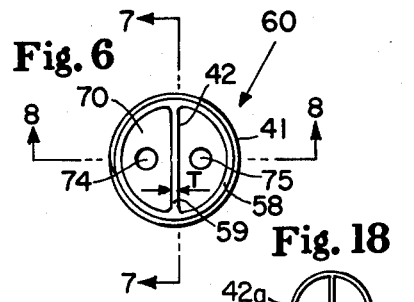
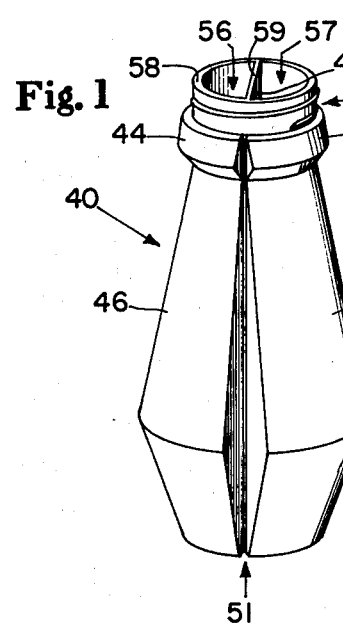
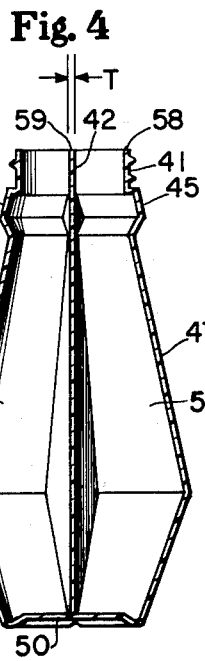
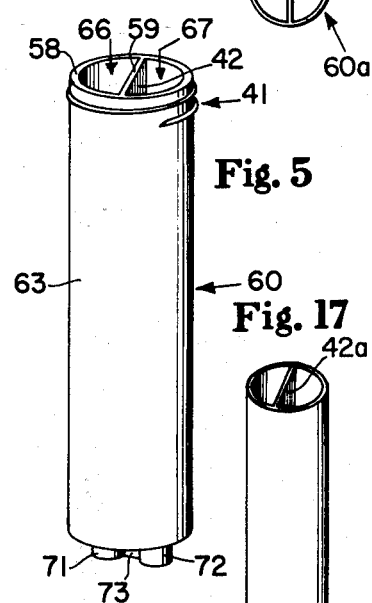
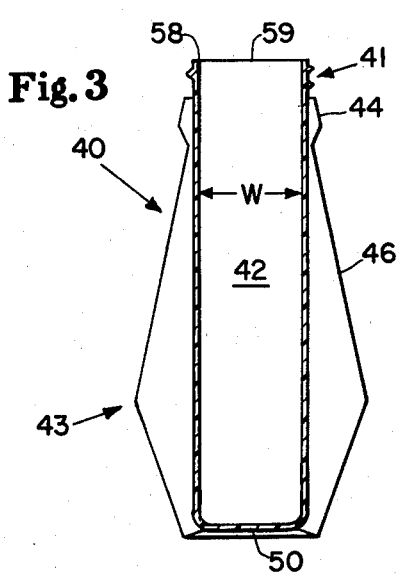
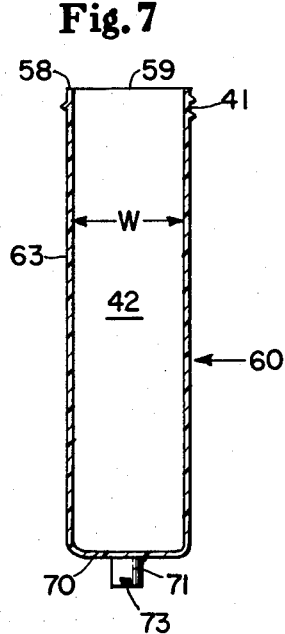
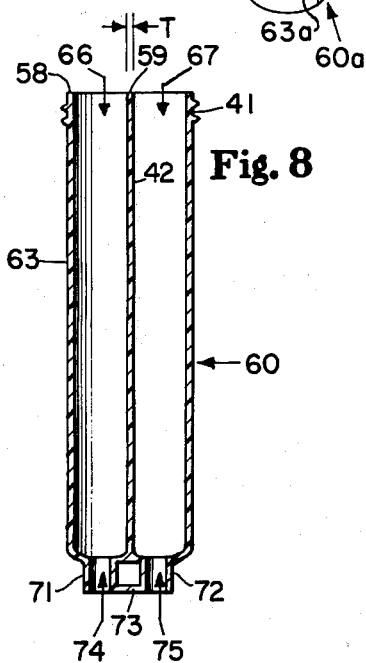

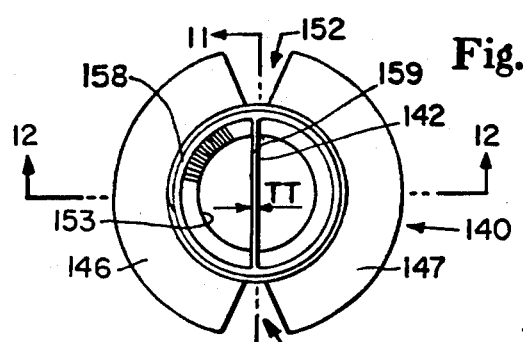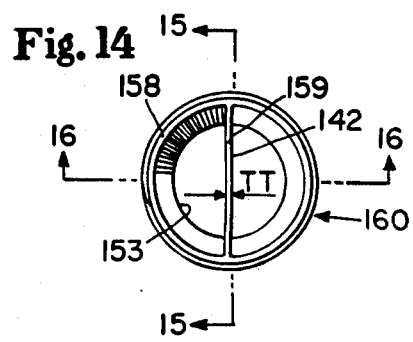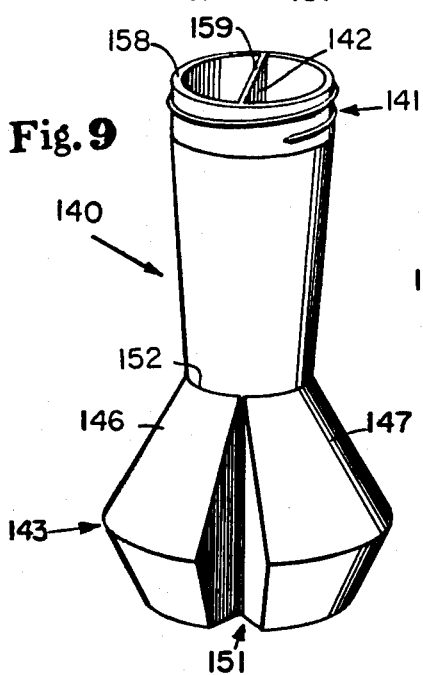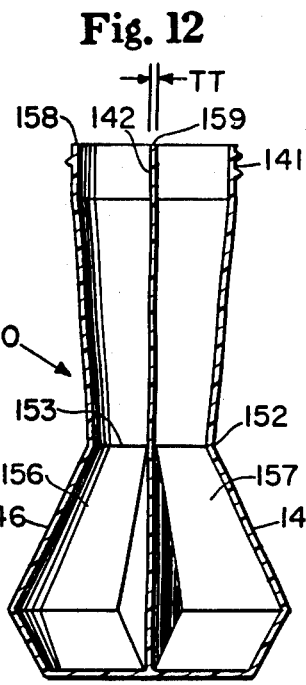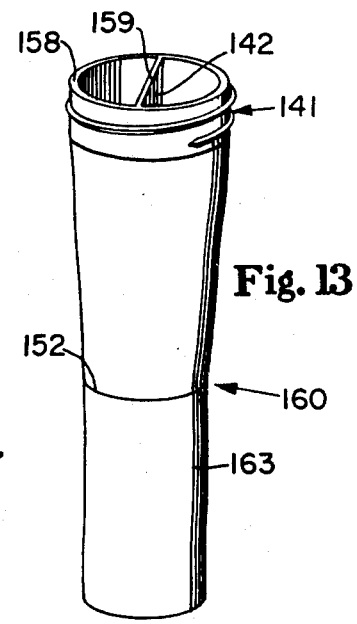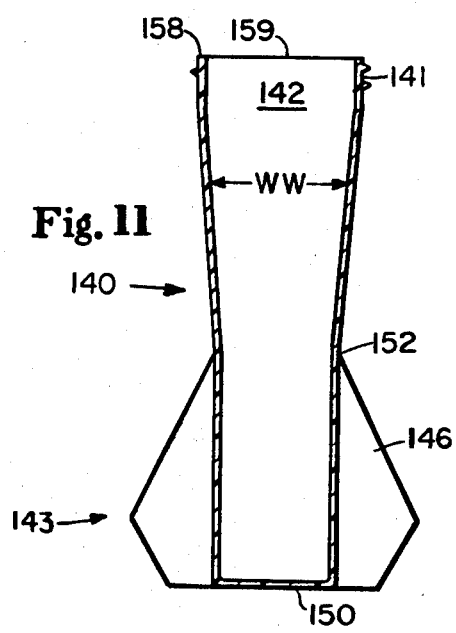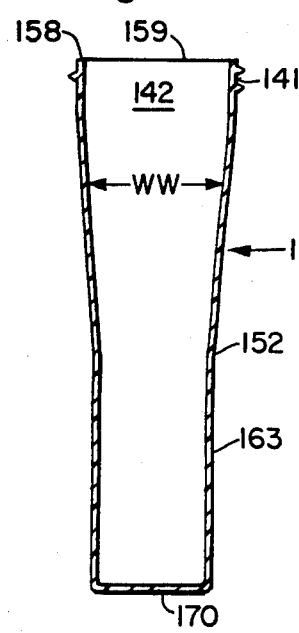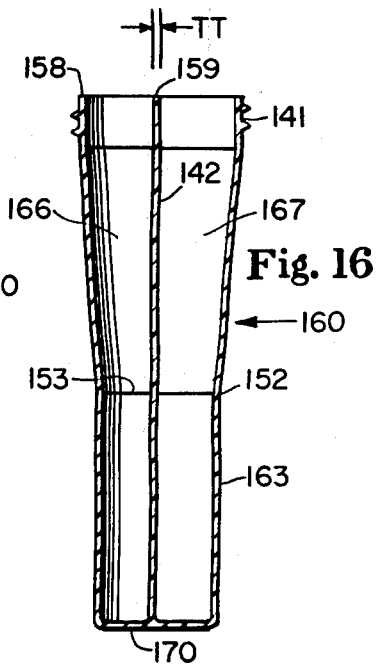

METHOD OF MAKING A PRECISELY PARTITIONED BULBOUS-SHAPE CONTAINER

This is a division of application Ser. No. 493,308, filed July 31, 1974 now abandoned.

CROSS REFERENCE TO RELATED APPLICATION

This application is related to the commonly assigned and concurrently filed application of Messrs. Malcolm B. Lucas, Theodore P. Merz, and Robert H. Van Coney, entitled "Apparatus For Making A Precisely Partitioned Bulbous-Shape Container" filed July 31, 1974, Ser. No. 493,307.

FIELD OF THE INVENTION

This invention relates generally to providing plural compartment containers such as thermoplastic bottles for separately storing, and co-dispensing components of products which components are desirably not mixed until about the time the use thereof is contemplated. More specifically, this invention relates to such containers of unitary construction having a bulbous-shape which containers are divided into compartments by a precisely sized, shaped, and oriented integral bulkhead.

BACKGROUND OF THE INVENTION

Bulbous-shape, unpartitioned containers of glass or thermoplastic materials are commonly made by blow molding either extruded parisons or injection molded preforms. U.S. Pat. No. 2,597,558 issued May 20, 1952 to James Bailey is representative of prior art which discloses blow molding of extruded parisons, and U.S. Pat. No. 3,707,591 issued Dec. 26, 1972 to George A. Chalfant is representative of prior art which discloses blow molding injection molded preforms.

Plural compartment, bulbous-shape containers are disclosed in the prior art wherein a plurality of bladders or bottles are disposed within a bulbous-shape container. U.S. Pat. No. 3,467,269 issued Sept. 16, 1969 to Harry A. Newton is representative of the plural bladder prior art, and U.S. Pat. No. 3,337,073 issued Aug. 22, 1967 to Donald Angelo is representative of prior art disclosing plural containers within an outer container. Such containers do not comprise integral partitions.

Blow molded containers having imprecisely oriented integral partitions are disclosed in the prior art of which U.S. Pat. No. 2,065,504 issued Dec. 29, 1936 to Norman R. Beck, U.S. Pat. No. 2,285,707 issued June 9, 1942 to Charles B. Garwood et al., and U.S. Pat. No. 2,951,264 issued Sept. 6, 1960 to James Bailey are representative.

Non-bulbous-shape plural compartment containers are disclosed in the prior art of which U.S. Pat. No. 2,731,013 issued Jan. 17, 1956 to Stannard D. Holmes, and U.S. Pat. No. 3,052,368 issued Sept. 4, 1962 to Philip W. Atkins et al. are representative.

Additionally, bulbous shape plural compartment containers are disclosed in the prior art of which U.S. Pat. No. 592,490 issued Oct. 26, 1897 to Johan P. Fangel, and U.S. Pat. No. 3,729,553 issued Apr. 24, 1973 to David Gold et al. are representative.

However, none of the prior art has solved all of the problems of providing a bulbous-shape, plural compartment, top-opening container of unitary construction which container is divided into compartments by a precisely sized, shaped, and oriented integral partition or bulkhead to the degree or extent of the present invention.

OBJECTS OF THE INVENTION

The nature and substance of the present invention will be more readily appreciated after giving consideration to its major aims and purposes. The principal objects of the invention are recited in the ensuing paragraphs in order to provide a better appreciation of its important aspects prior to describing the details of a preferred embodiment.

A major object of the present invention is providing an open-top, bulbous-shape, plural compartment container or bottle of unitary construction which container is divided into compartments by a precisely sized, shaped and oriented integral bulkhead.

Another major object of the present invention is providing a method of making a container or bottle as described in the preceding paragraph by providing a preform having a bulkhead of the size, shape, and orientation desired in the finished container, and then blow molding the exterior wall portion of the preform to form the bulbous portion of the container or bottle while constraining the bulkhead to substantially preclude its changing size, shape, or orientation during the blow molding operation.

Still another major object of the present invention is providing the method of making a container or bottle as set forth in the preceding paragraph wherein the preform is extruded or injection molded of thermoplastic material.

Yet still another major object of the present invention is providing the method of making a container or bottle as set forth in the preceding paragraph wherein said injection molding and said blow molding are effected in separate apparatuses or both molding operations are effected in a single injection-blow molding apparatus.

SUMMARY OF THE INVENTION

The objects of the present invention recited above and other objects of the present invention are achieved by providing an open-top container and method of making it wherein the container is of unitary construction and has an open-top body which is longitudinally partitioned into a plurality of cavities by a precisely sized, shaped and oriented integral bulkhead. At least one of the cavities has a bulbous-shape. The bulkhead has a top end and a bottom end. The bulkhead has no lower transverse cross-sectional portion having a substantially greater width than any transverse cross-sectional portion above it, and the bulkhead has no lower transverse cross-sectional portion having a substantially smaller thickness than any transverse cross-sectional portion disposed above it. The bulkhead may have a progressively narrower width from the top end to the bottom end, and may have a progressively greater thickness from its top end to its bottom end. The body of the container is divided into a plurality of cavity forming wall portions which extend outwardly from said bulkhead. Each cavity forming wall portion has an opening therein defined in part by the top end of the bulkhead so that the openings are separated by the top end of the bulkhead. The method of the present invention comprises the steps of providing by extruding or injection molding a longitudinally partitioned preform having a bulkhead of the size, shape and orientation desired in the finished container, and then blow molding at least one cavity forming wall portion of the body of the container to a bulbous-shape while constraining the bulkhead to substantially obviate the bulkhead from changing its size, shape or orientation during the blow molding operation.

BRIEF DESCRIPTION OF THE DRAWINGS

While the specification concludes with claims particularly pointing out and distinctly claiming the subject matter regarded as forming the present invention, it is believed the invention will be better understood from the following description in conjunction with the accompanying drawings in which:

FIG. 1 is a perspective view of a preferred container embodiment of the present invention.

FIG. 2 is a plan view of the container of FIG. 1.

FIG. 3 is a longitudinal (vertical) sectional view of the container shown in FIGS. 1 and 2 taken along line 3—3 of FIG. 2.

FIG. 4 is a longitudinal (vertical) sectional view of the container shown in FIGS. 1 and 2 taken along line 4—4 of FIG. 2.

FIG. 5 is a perspective view of an injection molded preform from which the container of FIG. 1 is formed.

FIG. 6 is a plan view of the preform shown in FIG. 5.

FIG. 7 is a longitudinal sectional view of the preform shown in FIGS. 5 and 6 taken along line 7—7 of FIG. 6.

FIG. 8 is a longitudinal sectional view of the preform shown in FIGS. 5 and 6 taken along line 8—8 of FIG. 6.

FIG. 9 is a perspective view of an alternate container embodiment of the present invention.

FIG. 10 is a plan view of the alternate container embodiment of FIG. 9.

FIG. 11 is a longitudinal (vertical) sectional view of the alternate container embodiment of FIGS. 9 and 10 taken along line 11—11 of FIG. 10.

FIG. 12 is a longitudinal sectional view of the alternate container embodiment of FIGS. 9 and 10 taken along line 12—12 of FIG. 10.

FIG. 13 is a perspective view of an injection molded preform from which the alternate container of FIG. 9 is blow molded.

FIG. 14 is a plan view of the preform of FIG. 13.

FIG. 15 is a longitudinal sectional view of the preform shown in FIGS. 13 and 14 taken along line 15—15 of FIG. 14.

FIG. 16 is a longitudinal sectional view of the preform shown in FIGS. 13 and 14 taken along line 16—16 of FIG. 14.

FIG. 17 is a reduced scale perspective view of an extruded preform having a precisely sized, shaped, and oriented integral bulkhead.

FIG. 18 is an end view of the preform shown in FIG. 17.

DESCRIPTION OF THE PREFERRED EMBODIMENT

A preferred container embodiment of the present invention is identified in FIG. 1 by the designator 40. The container or bottle 40 is of unitary construction and comprises a threaded neck 41, a bulkhead 42, and a body 43.

Although bulkhead 42 is described as a chordal bulkhead because it extends chordwise of the container body, it is not intended to limit the present invention to containers comprising chordal bulkheads. Rather, providing containers embodying the present invention which containers have more complex bulkhead configurations than chordal bulkheads is believed to be clearly within the skill of persons having ordinary skill in the art in view of the prior art and the present disclosure. However, the present invention is described hereinbelow through the use of a chordal divider to facilitate explaining the present invention so that it can be clearly understood.

Body 43 comprises an upper pair of siamese bulbous-shape wall portions 44, 45, FIG. 4, disposed subjacent neck 41 and a lower pair of siamese bulbous-shape wall portions 46, 47. Container 40 may be composed of thermoplastic materials; for instance, polyethylene or polypropylene.

Chordal bulkhead 42, FIG. 3, is precisely sized, shaped, oriented and finished in container 40 so that it extends substantially vertically upwardly all the way from the bottom wall 50 of container 40 to the top of neck 41. Therefore, bulkhead 42 partitions container 40 into two back-to-back compartments or cavities 56, 57, FIG. 1, having predetermined shapes. The circular upper edge 58, FIG. 1, of neck 41 and the top edge 59 of bulkhead 42 are co-planar to facilitate sealing both compartments 56, 57 with a single cap, or sealingly securing another fitment to container 40.

As will be described more fully hereinafter, Bulkhead 42 of the preferred embodiment container 40 is tapered so that it has a progressively narrower width W, FIG. 3, and a progressively greater thickness T, FIG. 4, from its top edge 59 to the bottom wall 50 of container 40. In the preferred embodiment container 40, the degrees of taper of W and T are about one-half-of-one degree and are therefore not distinguishable in the figures.

Container 40 may be made by the method comprising the step of blow molding the body of a molded preform 60 of the configuration shown in FIGS. 5 through 8 inclusive while constraining or confining the neck and the bulkhead of the preform 60 so that their sizes, shapes, orientations and finishes do not change substantially while the body is being blow molded. In this manner, the finish on the bulkhead can have the smoothness and flatness achievable through injection molding while the overall container can have a bulbous-shape not amenable to injection molding. Such smoothness and flatness are commercially desirable, for instance, because they precipitate a minimal amount of optical distortion.

THE PREFERRED PREFORM

Preform 60, FIGS. 5 through 8, comprises some portions which are substantially identically sized, shaped, and oriented as their counterparts in container 40 and are therefore identified by the same designators as in container 40, FIGS. 1 through 4 inclusive. Preform 60, FIG. 5, comprises a threaded neck portion 41, a chordal bulkhead portion 42, and a body forming portion 63 which are hereafter simply referred to as neck 41, bulkhead 42, and body 63. The neck 41 and the body 63 are divided into two longitudinally extending chambers 66, 67, FIG. 8, by bulkhead 42.

Neck 41 and bulkhead 42 of preform 60, FIG. 4, are substantially identical to neck 41 and bulkhead 42 respectively of container 40, FIG. 1. That is, when preform 60 is molded, as by injection molding, neck 41 and bulkhead 42 thereof are molded to the respective final shapes, sizes and orientations they have in container 40 after the preform 60 has been converted by blow molding it to form a container 40 as described above. Of course, this requires choosing neck and bulkhead configurations which are amenable to being injection molded, and subsequently being constrained or confined to obviate their changing sizes, shapes, or orientations during a blow molding operation. During such blow molding operation, neck 41 and bulkhead 42 are constrained or confined to substantially obviate their changing sizes, shapes, orientations, or finishes so that only the shape of body 63 of preform 60 is changed. Without so constraining or confining the neck 41 and the bulkhead 42 during the blow molding of body 43, their precise shapes, sizes, orientations and finishes obtained by being injection molded would be compromised as a result of the blow molding operation.

The space within neck 41 and the body 43 of preform 60 is divided into two longitudinally (vertically) extending chambers 66, 67, FIG. 8, by bulkhead 42. The neck 41, bulkhead 42, and body 63 of preform 60 are so configured that the chambers 66, 67 are slightly but not noticeably tapered in such a manner that they have progressively smaller plan-view cross-sections from the top edge 59 to the bottom wall 70, FIG. 7, of preform 60.

As stated hereinbefore, the width W of bulkhead 42 is tapered so that the width of bulkhead 42 is progressively smaller from its top edge 59 to its bottom where it intersects the bottom wall 70 of preform 60, and the thickness T of bulkhead 42 is tapered so that the thickness of bulkhead 42 is progressively greater from its top edge 59 to its bottom.

The tapers provided for chambers 66, 67, and the width W and the thickness T of bulkhead 42 define an internal preform geometry which can be formed through the use of a bifurcated male mandrel in an injection molding apparatus. Further, the tapered geometry of bulkhead 42 enables constraining or confining the bulkhead between blow mold members to obviate its changing size, shape, orientation, or finish while preform 60 is blow molded to convert it into a container 40. Bulkhead 42 of preform 60, FIG. 5, can be so constrained, for instance, through the use of a bifurcated male mandrel disposed inside the preform in combination with female mold members of the blow mold disposed outside the preform. The V-shape, vertically extending notches 51, 52, FIGS. 1 and 2, in container 40 are precipitated by female mold members which are configured to constrain or confine the substantially vertical side edges of bulkhead 42 when preform 60 is blow molded to convert it into a container 40. Such apparatus is disclosed in the hereinbefore cross referenced, related application entitled "Apparatus For Making A Precisely Partitioned Bulbous-Shape Container".

Referring again to FIGS. 5 through 8, preform 60 also comprises hollow tubular extensions 71, 72 depending from its bottom wall 70 and a runner 73 extending transverse intermediate the distal ends of the tubular extensions 71, 72. Passageways 74, 75 extend longitudinally through tubular extensions 71, 72 respectively. Thus, as can be seen in FIG. 8, the uppermost ends of passageways 71, 72 are holes in the bottoms of chambers 66, 67 which holes have to be closed when a preform 60, FIG. 5, is converted into a container 40, FIG. 1. The tubular extensions 71, 72 provide material which can be pinched-off to close the holes in bottom wall 70 when a blow mold is closed about the preform 60. Such pinching-off to close holes can be accomplished in the same manner that the bottom end of an extruded tubular parison is pinched-off to close an end of a parison in bottle blow molding apparatus which manner is familiar to those skilled in the art of extrusion-blow molding.

Although preform 60, FIG. 5, comprises hollow tubular extensions 71, 72 and runner 73, it is not intended to thereby limit the present invention. Rather, the tubular extensions are a by-product of molding apparatus disclosed in the hereinbefore cross referenced, commonly assigned, and related U.S. Patent Application.

Briefly, however, such a molding apparatus for making containers 40 comprises a bifurcated male mandrel having cantilevered halves which have relatively high slenderness ratios. Such high slenderness ratio cantilevered members are subject to being bent or displaced when subjected to high injection molding pressures. To prevent such bending or displacement, the distal ends of the cantilevered halves of the bifurcated male mandrel are pinned to the head of the apparatus. The pins precipitate holes through the bottom wall of the injection molded preforms. Therefore, the injection mold members are further configured to integrally form tubular extensions on the preform about the pins to provide material which can subsequently be pinched-off to close the holes in the bottom wall of the preform. Of course, whenever the configuration of the preform is such that a cantilevered bifurcated male mandrel has sufficient strength to withstand injection molding conditions without substantial deformation, the mold members should be configured to make preforms with closed bottom walls. A preform having such a closed bottom wall is described hereinafter and illustrated in FIGS. 13 through 16 inclusive.

While the width W and thickness T of bulkhead 42 of the preferred embodiment container 40 are tapered, it is not intended to thereby limit the present invention. For materials which shrink substantially when cooled, substantially zero draft molds can be utilized to provide a bulkhead which has no lower transverse cross-sectional portion having a substantially greater width than any transverse cross-sectional portion disposed above it, and has no lower transverse cross-sectional portion having a substantially smaller thickness than any transverse cross-sectional portion disposed above it. However, providing a bulbous-shape container configuration comprising a bulkhead having a size, shape, orientation, and finish which bulkhead is amenable to being incorporated in an injection molded preform in such a manner that the bulkhead can be constrained from substantially changing its size, shape, orientation, or finish while the body portion of the preform is blow molded to form the bulbous-shape body of the container is believed to be important with respect to the present invention.

ALTERNATE CONTAINER EMBODIMENT

An alternate container embodiment of the present invention is identified, FIG. 9, as container 140 comprising neck 141, bulkhead 142, and body 143.

Without unduly repeating the relationship that preform 60, FIG. 5, bears to the preferred embodiment container 40, FIG. 1, as described hereinbefore, container 140, FIGS. 9 through 12 inclusive, can be blow molded from an injection molded preform 160, FIGS. 13 through 16 inclusive, while constraining neck 141 and bulkhead 142 of the preform 160 from changing size, shape, orientation, or finish during the blow molding operation. For convenience, the designators used for the container 140, preform 160, and their features are all just one hundred higher than the designators used in conjunction with the preferred embodiment container 40, preform 60, and their features.

Container 140, FIGS. 9 through 12, has a pair of siamese bulbous-shape body portions 146, 147 and an extended threaded neck 141 having an inverted, truncated conical shape. The neck 141 extends from the circular upper edge 158 to the outer beltline 152. The interior beltline is designated 153, FIG. 10. The neck 141 and bulkhead 142 of container 140 are substantially identical in size, shape, and relative orientation to neck 141 and bulkhead 142 respectively of preform 160, FIGS. 13 through 16. Furthermore, bulkhead 142 is tapered so that it has a progressively narrower width WW and a progressively greater thickness TT from its top edge 159 to the bottom wall 70 of preform 160 so that the bulkhead 142 can be constrained or confined as described hereinbefore from substantially changing its size, shape, orientation, or finish when the preform 160 is converted to container 140 by a blow molding operation.

Preform 160, FIGS. 13 through 16, does not comprise tubular extensions such as the tubular extensions 71, 72, FIGS. 5 through 8, which depend from preform 60. As stated previously, such tubular extensions are by-products of preferred molding apparatus and can be dispensed with if a cantilevered bifurcated male mandrel has sufficient strength to withstand injection molding conditions such as unevenly distributed high pressures.

METHOD

The method of making a precisely partitioned bulbous-shape container as described hereinabove comprises the step of injection molding an open-top preform having a body forming portion, and a longitudinally extending bulkhead of the size, shape, orientation, and finish required in the container, and the step of blow molding the body forming portion to the bulbous-shape of the container while constraining or confining the bulkhead from substantially changing its size, shape, orientation or finish. The method may further comprise the steps of cooling the preform below its thermoplastic temperature after the injection molding step, and subsequently heating the body forming portion to a sufficiently high temperature prior to the blow molding step to enable blow molding the body forming portion to the bulbous-shape of the container.

ALTERNATE METHOD

Alternatively, a bulbous-shape container substantially identical to container 40, FIG. 1, except for having an untapered bulkhead of substantially uniform thickness and width throughout its length may be made by the method comprising the steps of: extruding an endless tube having an integral longitudinally extending bulkhead and a tubular body; cutting a predetermined length from the tube to provide a discrete preform such as preform 60a, FIG. 17; heating the body of the preform to a sufficiently high temperature equal to or greater than its thermoplastic temperature to enable pinching one end of the preform closed and to enable blow molding the body; pinching the one end of the preform closed and, blow molding the body of the preform to achieve the bulbous-shape of the container while constraining or confining the bulkhead from substantially changing size, shape, or orientation.

ALTERNATE PREFORM EMBODIMENT

Alternate embodiment preform 60a, FIGS. 17 and 18, comprises a tubular body 63a and an integral chordal bulkhead 42a. Neither the body nor the bulkhead are tapered.

Discrete preforms 60a may be made by cutting predetermined lengths from an endless extruded thermoplastic tube.

An alternate embodiment preform 60a may be converted into a longitudinally partitioned bulbous-shape, top opening container of unitary construction which container is substantially identical to container 40, FIG. 1. Such conversion requires pinching one end of the preform 60a closed in addition to constraining or confining the bulkhead from substantially changing its size, shape, or orientation during while the body of the preform is blow molded to its ultimate bulbous shape.

While particular embodiments of the present invention have been illustrated and described, it will be obvious to those skilled in the art that various changes and modifications can be made without departing from the spirit and scope of the invention. It is intended, therefore, to cover in the appended claims, all such changes and modifications that are within the scope of this invention.

What is claimed is:

1. A method of making a bulbous-shape open-top container of unitary construction of thermoplastic material which container is precisely partitioned by a longitudinally extending internal bulkhead of predetermined size, shape and orientation, said method comprising:

providing a longitudinally partitioned preform of said thermoplastic material which preform comprises a tubular exterior wall and said internal bulkhead, said step of providing a preform comprising cutting a predetermined length from an endless longitudinally partitioned tubular extrusion comprising said tubular exterior wall and an integral longitudinally extending said internal bulkhead;

heating the body of said preform to a sufficiently high temperature equal to or greater than the thermoplastic temperature of said thermoplastic material to enable pinching one end of said preform closed and to enable blow molding said exterior wall to said bulbous-shape of said container;

pinching said one end of said preform closed prior to said blow molding; and converting said preform into said container by blow molding said exterior wall of said preform to said bulbous-shape while constraining said bulkhead along its faces and edges, during said heating, said pinching, and said blow molding, to virtually obviate changing its size, shape, or orientation during said blow molding.

* * * * *